UNITED STATES PATENT OFFICE.

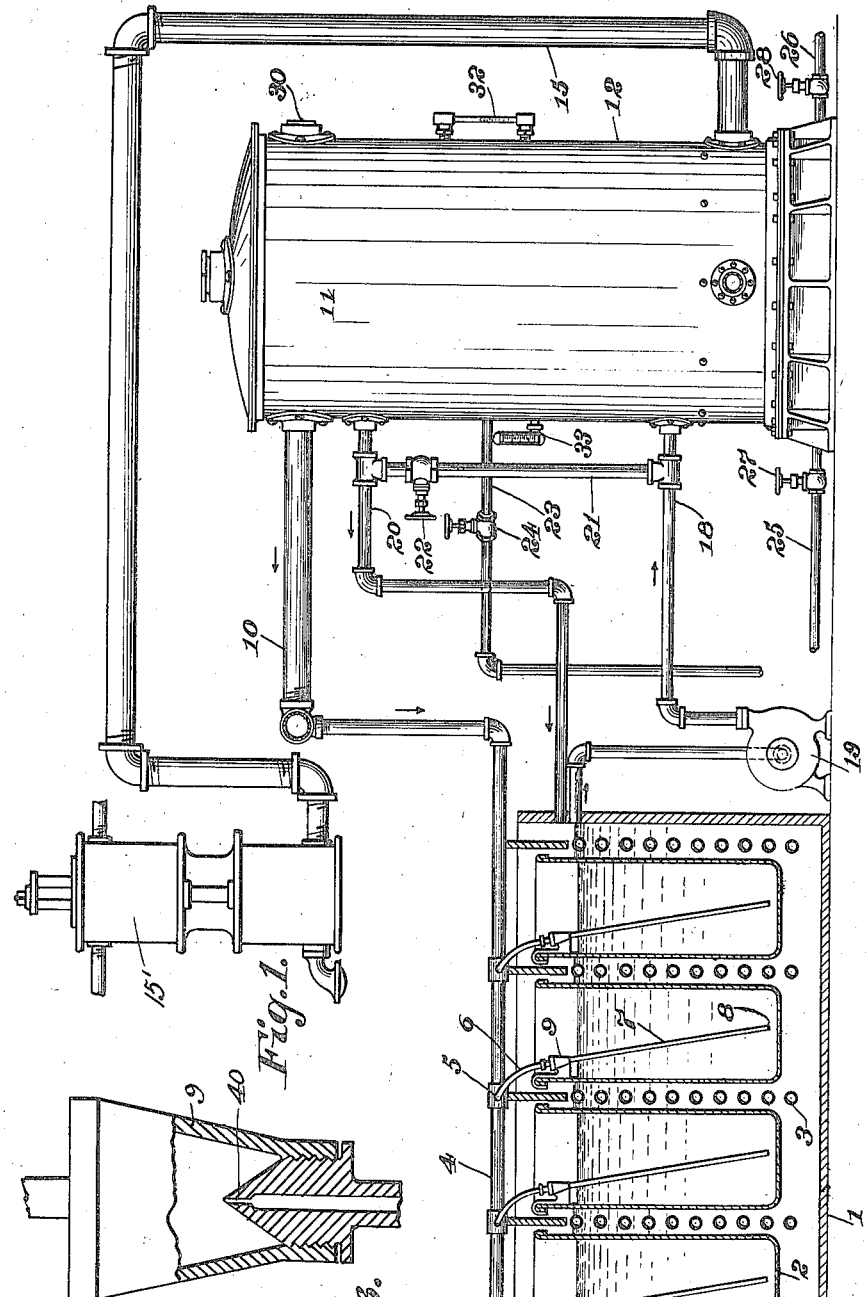

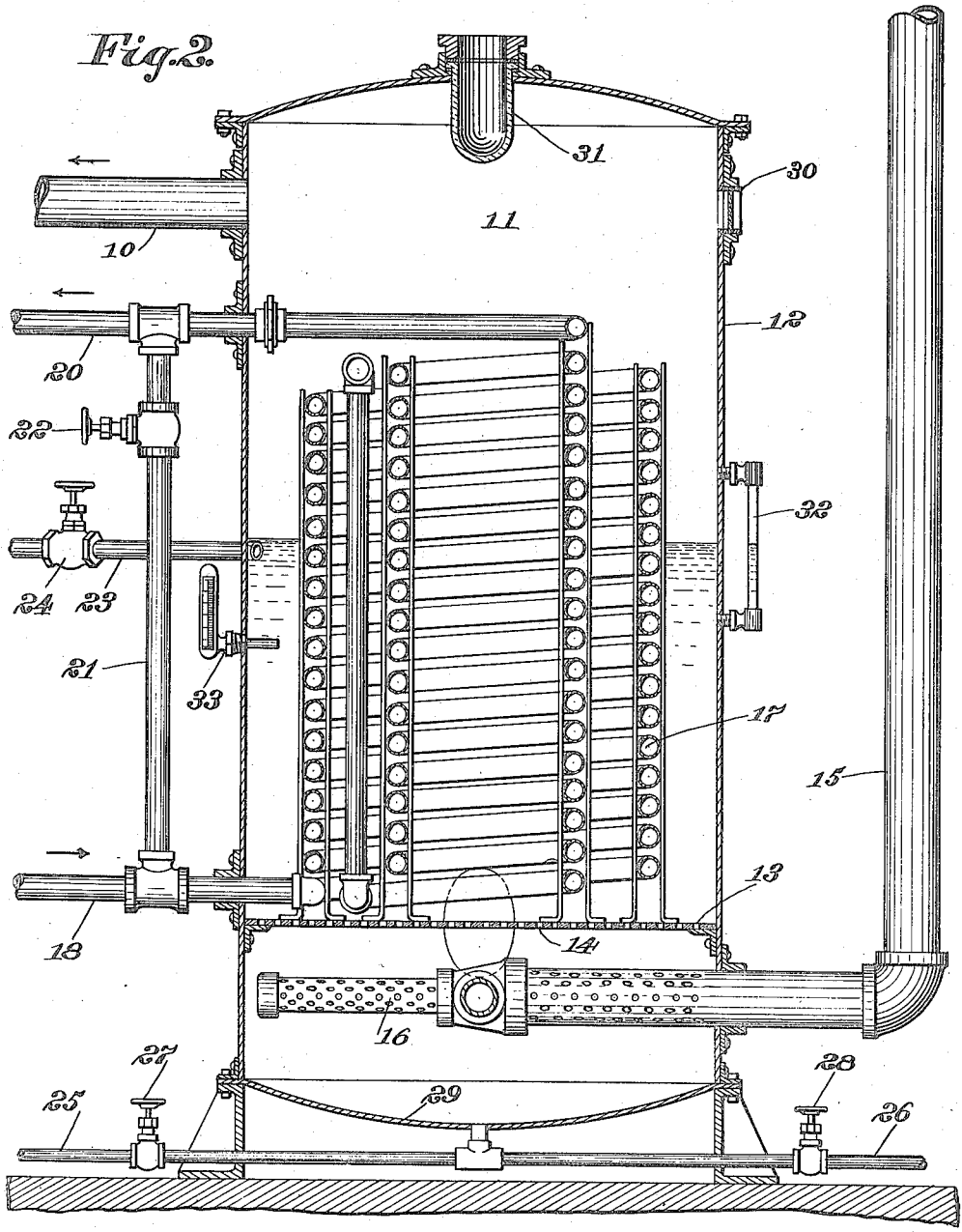

WILLIS B. KIRKPATRICK, OF BALTIMORE, MARYLAND, ASSIGNOR TO INDEPENDENT ICE COMPANY OF BALTIMORE CITY, OF BALTIMORE, MARYLAND, A CORPORATION OF MARYLAND.

APPARATUS FOR MANUFACTURING ICE.

1,221,746.      Specification of Letters Patent.      Patented Apr. 3, 1917.

Application filed March 25, 1916. Serial No. 86,532.

*To all whom it may concern:*

Be it known that I, WILLIS B. KIRKPATRICK, a citizen of the United States of America, residing in the city of Baltimore, State of Maryland, have invented certain new and useful Improvements in Apparatus for Manufacturing Ice, of which the following is a specification.

This invention relates to the manufacture of can ice by the air agitation method.

In the practice of this method, as known to those skilled in the art, air under pressure of one or two pounds above atmosphere, is released at or near the bottom of the cans during freezing and passes upward through the body of the water, keeping up a continuous agitation of the liquid so that the particles of suspended matter, gas, salts, etc., are not permitted to become embodied in the ice.

In all such systems in order that a uniform product of high quality may result, the agitation is made as nearly continuous as possible and the flow of air continued until the freezing is complete. If the passage of air to any can is by chance interrupted, the action taking place is immediately changed to the extent that the deposit of the suspended particles of solid matter and globules of gas is not interfered with and the ice formed after the interruption of the current is heavily clouded or white ice.

Interruptions of the air agitation may result from two sources. The first is freezing of the water in the can so that it arrests the upward passage of the air after it leaves the nozzle from which it is discharged into the water. This is overcome by various provisions for increasing the air pressure, as the resistance increases so as to force the air through the ice, or in the low pressure systems in which no excess pressure is to be had, by removing the pipe in time to keep it from being frozen in. This leaves a considerable portion of white ice.

The second cause of interruption of the air supply is the formation of frost in the air pipes, either in the drop pipe by which the air is led to the bottom of the can, or in the cooler or dehydrater in which the air is cooled before it is supplied to the drop pipe, to reduce the content of moisture in the air and in this way to reduce the tendency to form frost in the drop pipes.

In my Patents Nos. 1,169,164 and 1,162,075, I have described a method and apparatus for manufacturing ice by the agitation method in which the drop pipe is protected from the temperature of the brine by placing it near the center of the can so that it is made possible to utilize the air at medium pressures, dehydrated at a comparatively high temperature and to continue agitation until freezing is complete, for with the drop pipe thus protected, there is practically no deposit of frost in this part of the system and by dehydrating at the temperatures referred to, using fresh water as a heat transfer medium, the formation of ice in the dehydrater is likewise avoided so that a continuously operating system producing ninety-eight to one hundred per cent. perfect ice is obtained.

According to the disclosure of the patents above cited, dehydration is accomplished by means of a coil of ammonia pipes beneath which is a coil of air pipes, the air being cooled by the flow of water over the ammonia pipes and downward over the air coil. But there is a slight extra expense involved in this practice for in winter it is customary to shut down for several hours at a time, particularly at night. As freezing continues it is necessary to keep up the air supply and this entails the running of the ammonia system merely to dehydrate the air for agitation. The present invention relates to a new method and means of dehydrating the air which is dependent for its action on a supply of brine taken from the freezing tank, the air agitation being to this extent made independent of the ammonia system.

I am aware that it is not broadly new to use brine from the tank in dehydrating air for agitation in the manufacture of ice but previous systems are dependent for the transfer of heat on the contact of the air with the pipes containing the brine. This is effective when the pipes are clean, but they soon become coated with frost so that the effectiveness of the dehydrater decreases rapidly when it is in operation. The expedient of using two such dehydraters connected in parallel so that they can be operated and cleared of frost alternately, the latter by running hot water through the coil, has been tried, but the necessity for providing two hydraters and for the extra attention incident to the operation of the dual system has been overcome in the present instance by submerging the brine coil in water through which the air to be dehydrated is passed. The water serves to take up the moisture deposited by the air in cooling so that the efficiency of the dehydrater is not affected by continued operation and dehydration and washing of the air are accomplished simultaneously whereby the washer which is a necessary feature of the apparatus in general use, as well as the extra dehydrater of the dual system just referred to are dispensed with and a simple, cheap and effective apparatus is provided which accomplishes with absolute certainty and regularity the degree of cooling and dehydration necessary for the system described in my patents above cited, in which the drop pipe is protected from the brine by placing it near the center of the can, for it will be understood that water is less active as a medium for the transfer of heat than are the metal pipes composing the brine coil.

The new apparatus consists of a container having an air pipe introduced at the bottom. In the container is a coil through which the brine from the freezing tank is circulated and water is used as a heat transfer medium as in the dehydrater shown in my previous patents. The coil is submerged for the greater portion of its length in the water in the dehydrater but a portion of it may be exposed, as shown; however, with the water as the main heat transfer medium and a small area of pipe exposed, there is no trouble from frost as the air escaping from the water is warm enough and sufficient in volume to keep the pipe free of such deposit.

It will be apparent that in the practice of the present dehydrating method, the temperature of the brine will vary, but owing to the fact that in the practice of the method described in the above-cited patent, it is unnecessary to cool the air to an excessively low temperature or to a point near freezing as in the high pressure systems in which the drop pipes are exposed to the brine, the present method of dehydration is particularly adapted for combination with the other features of the method described in my said patent, being in fact an improved substitute for the dehydrating method disclosed in that patent.

In the accompanying drawings, I have illustrated an apparatus for making ice by the air agitation system including a dehydrater combined with this system and constructed in accordance with the principles of my invention.

Figure 1 is a diagrammatic view of the entire system; and

Fig. 2 is a vertical central section through the dehydrater;

Fig. 3 is a view partly in elevation and partly in vertical central section through the pressure reducing device.

Referring to the drawing by numerals, each of which is used to indicate the same or similar parts in the different figures, the drawing includes a brine tank 1, with ice cans 2 and ammonia pipes 3. Above the tank is an air header 4 from which air is led by way of T's 5, connections 6 and drop pipes 7 to the bottoms of the cans 2. It should be noted that while the pipes 7 are preferably inclined, they are well toward the centers of the cans. Between the air header 4 and the drop pipes 7 is some convenient means for reducing the air pressure under normal flow but permitting it to build up to overcome obstructions, as the formation of ice about the outlet 8 of the drop pipe. In the form of the invention shown, this reducing means may be located in the fitting 9 and it may be of the type shown and described in my Patent No. 1,169,164.

In Fig. 3 I have shown a section through the fitting 9 which discloses the pressure reducing orifice 40 which operates according to the principles laid down in my prior patent.

Air is supplied to the header 9 by way of the main 10 leading from the dehydrater 11, and the features of this dehydrater as combined with the rest of the plant and both this apparatus and the method hereinafter described, constitute the subject of my invention.

The dehydrater 11, see particularly Fig. 2, consists of an outer shield or casing illustrated in the form of a cylinder 12 having a horizontal partition or floor 13 perforated at 14 for the passage of air which is introduced beneath the floor 13 by way of an inlet pipe 15, perforated at 16 and supplied with air under pressure, the present apparatus being made to work most efficiently with air at twenty-five pounds. In the present instance air under pressure may be supplied by the pump 15' or by any other suitable means. The floor or partition 13 supports a coil 17 which is supplied with brine from the tank 1 by way of the supply pipe 18, the dehydrater being preferably placed between the tank and the store-room to which brine is led to maintain the desired low temperature. The circulation is provided by a suitable pump 19, the brine after it is passed through the coil being conducted to the store-room by way of the pipe 20. For the purpose of regulating the flow, I provide a by-pass 21 connecting the inlet and outlet pipes 18 and 20 and a valve 22 in the by-pass. When the valve is closed, the entire capacity of the pump passes through the coil and when it is wide open the resistance of the coil causes the brine to take the shorter course through the by-pass. Thus the circulation and hence the temperature of the dehydrater is regulated.

The dehydrater casing is supplied with water, preferably fresh, to any suitable level, and provided with a skimmer pipe 23 having a suitable valve 24 for drawing off oil from the compressor and sediment, dust and the like from the air which settles on the surface of the water. At the bottom, there is a suitable supply and outlet pipe 25 and 26 with valves 27 and 28, the outlet being shown as at the center of a downwardly convex plate 29 forming the bottom of the dehydrater cylinder. At the top, I preferably provide observation openings 30 and 31. There is also a water glass 32 and a thermometer 33.

In the operation of the plant, the tank 1 is filled with brine, the cans 2 with water; ammonia is passed into the pipes 3, and air under pressure from 15 to 30 pounds is passed through the dehydrater 11. The brine is duly circulated through the coil 17 from the tank 1 and the air after passing from the dehydrater through the supply pipe 10 to the headers 9 is led through the drop pipes 7 to the bottom of the cans, the pressure being sufficiently reduced before the air is released to effect the greatest possible economy.

In the operation of the dehydrater, the brine is taken from the tank by way of the pipe 18, the circulation being maintained by the pump 19, passed through the coil 17 and back to the tank by way of the storage rooms, going through the pipe 20. The by-pass 21 with the valve 22 is utilized to regulate the flow of brine through the coil and hence the temperature in the dehydrater which is observed by means of the thermometer 33. The air under pressure is injected by way of the perforations 16 into the water beneath the floor 13 and passes upward through the perforations 14 which serve to break it up, distribute it and bring it in contact with the water in as fine particles as possible.

In this way the air is cooled and at the same time washed, the moisture deposited from the air by the dehydration incident to the drop in temperature being taken up by the water in the dehydrater so that there is no variation incident to the continued operation of the dehydrater. This results in a continuous supply of air to the drop pipes, sufficiently dehydrated and at a temperature sufficiently low to prevent clogging of the pipes when protected in accordance with the provisions of my patents already referred to.

Other important features of the invention are incident to the fact that it provides a dehydrater which is cheap to construct, practically indestructible and requiring little attention in its operation, which may be conveniently inserted in the brine pipe between the tank and the store-room, which accomplishes both washing and dehydration simultaneously, which is never so affected by the deposit of frost as to require flushing with hot water or other attention to make it efficiently operative and which does not become clogged with frost so as to require duplication of the device for the purpose of alternating the operation of each unit.

What I claim and desire to secure by Letters Patent is:

1. In an apparatus for making can ice by the air agitation method, a brine tank, ice cans in the brine, drop pipes near the centers of the cans, air headers leading to the drop pipes, means for supplying air under pressure, means for cooling the brine, a dehydrater consisting of a coil submerged in water and having connections to the brine tank, means for circulating the brine through the coil and passing the air in finely divided particles through the water surrounding the coil, and means for reducing the pressure of the air as it enters the cans.

2. In an apparatus for making can ice by the air agitation method, a brine tank, ice cans in the brine, drop pipes, air headers leading to the drop pipes, means for supplying air under pressure, means for cooling the brine, a dehydrater through which the air is passed before entering the headers consisting of a coil submerged in water and having connections to the brine tank, means for circulating the brine through the coil and passing the air through the water around the coil, and means for reducing the pressure of the air as it enters the cans.

3. In an apparatus for making can ice by the air agitation method, a brine tank, ice cans in the brine, drop pipes near the centers of the cans, air headers leading to the drop pipes, means for supplying air under pressure, means for cooling the brine, the dehydrater through which the air is passed having a passage for brine with connections to the brine tank, and means for passing the brine through the passage, the dehydrater containing a quantity of fresh water as a heat transfer medium, and means for breaking the air up into finely divided particles.

4. In an apparatus for making can ice by the air agitation method, a brine tank, ice cans in the brine, drop pipes near the centers of the cans, air headers leading to the drop pipes, means for supplying air under pressure, means for cooling the brine, the dehydrater through which the air is passed consisting of a coil with connections to the brine tank, means for passing the brine through the coil, the dehydrater containing a quantity of fresh water as a heat transfer medium, and means for introducing the air beneath the coil, a perforated plate between the coil and the end of the air pipe for breaking up the air and distributing it through the water around the coil.

Signed by me at Baltimore, Maryland, this 24th day of March 1916.

WILLIS B. KIRKPATRICK.

Witnesses:
 ZELLA KUHN,
 ALICE Y. DONEGAN.